United States Patent
Bach

(10) Patent No.: US 11,486,295 B2
(45) Date of Patent: Nov. 1, 2022

(54) DUAL FUEL INJECTION SYSTEM FOR OPTIMIZING FUEL USAGE AND MINIMIZING SLIP FOR DIESEL AND GASOLINE ENGINES

(71) Applicant: Dynamic Fuel Systems, Inc., Winter Park, FL (US)

(72) Inventor: Jeffrey R. Bach, Sanford, FL (US)

(73) Assignee: Dynamic Fuel Systems, Inc., Winter Park, FL (US)

( * ) Notice: Subject to any disclaimer, the term of this patent is extended or adjusted under 35 U.S.C. 154(b) by 0 days.

(21) Appl. No.: 17/588,162

(22) Filed: Jan. 28, 2022

(65) Prior Publication Data

US 2022/0260005 A1 Aug. 18, 2022

Related U.S. Application Data

(63) Continuation of application No. 17/110,781, filed on Dec. 3, 2020, now Pat. No. 11,236,665, which is a
(Continued)

(51) Int. Cl.
*F02D 41/00* (2006.01)
*F02D 19/00* (2006.01)
(Continued)

(52) U.S. Cl.
CPC .......... *F02B 37/18* (2013.01); *F02D 19/0694* (2013.01); *F02D 19/081* (2013.01);
(Continued)

(58) Field of Classification Search
CPC ............. F02D 41/0025; F02D 41/0027; F02D 19/081; F02D 19/00647; F02D 19/061; F02D 41/3094; F02D 19/0642
See application file for complete search history.

(56) References Cited

U.S. PATENT DOCUMENTS 2,767,691 A * 10/1956 Mengelkamp ........ F02D 19/061
123/1 R
4,892,561 A 1/1990 Levine
(Continued)

FOREIGN PATENT DOCUMENTS

DE 102010048910 4/2011
DE 102007039313 8/2019
(Continued)

*Primary Examiner* — Long T Tran
(74) *Attorney, Agent, or Firm* — McHale & Slavin, P.A.

(57) ABSTRACT

The invention involves a system and method for providing a liquid fuel or a liquid and gaseous fuel to a diesel or Otto cycle engine for operation of the engine. The system includes a primary electronic control module (ECM), which monitors engine sensors and contains a first three-dimensional fuel map for the liquid fuel. A second ECM is connected for bi-directional transfer of information to the first ECM, the second ECM contains a second three-dimensional fuel map for delivery of the gaseous fuel through a secondary gaseous fuel injection assembly. The bi-directional communication between the two ECMs while monitoring the engine sensors allows both ECMs to "learn" an efficient fuel map for delivery of both fuels in the same cycle for improved efficiency, reduction in slip and lower emissions.

23 Claims, 9 Drawing Sheets

Related U.S. Application Data continuation of application No. 16/240,385, filed on Jan. 4, 2019, now Pat. No. 10,890,106.

(60) Provisional application No. 62/613,552, filed on Jan. 4, 2018.

(51) Int. Cl.

| | | |
|---|---|---|
| *F02B 37/18* | (2006.01) | |
| *F02D 19/06* | (2006.01) | |
| *F02M 21/02* | (2006.01) | |
| *F02D 19/10* | (2006.01) | |
| *F02D 19/08* | (2006.01) | |
| *F02M 21/06* | (2006.01) | |

(52) U.S. Cl.
CPC ....... *F02D 19/105* (2013.01); *F02D 41/0025* (2013.01); *F02D 41/0027* (2013.01); *F02M 21/0212* (2013.01); *F02M 21/06* (2013.01); *F02D 19/066* (2013.01); *F02D 19/0647* (2013.01); *F02D 19/0673* (2013.01); *F02D 2400/11* (2013.01)

(56) References Cited

U.S. PATENT DOCUMENTS

| | | |
|---|---|---|
| 5,383,647 A | 1/1995 | Jorach et al. |
| 5,632,786 A | 5/1997 | Basu et al. |
| 6,095,102 A | 8/2000 | Willi et al. |
| 6,145,495 A | 11/2000 | Whitcome |
| 6,202,601 B1 | 3/2001 | Ouellette et al. |
| 6,206,940 B1 | 3/2001 | Weissman et al. |
| 6,213,104 B1 | 4/2001 | Ishikiriyama et al. |
| 6,286,482 B1 | 9/2001 | Flynn et al. |
| 6,324,827 B1 | 12/2001 | Basu et al. |
| 6,607,567 B1 | 8/2003 | Towfighi |
| 6,901,889 B1 | 6/2005 | Ritter et al. |
| 7,100,582 B1 | 9/2006 | Bach |
| 7,225,763 B2 | 6/2007 | Ritter et al. |
| 7,488,357 B2 | 2/2009 | Tavlarides et al. |
| 9,752,515 B1* | 9/2017 | Stroup ............... F02D 41/0025 |
| 2004/0250797 A1 | 12/2004 | Shetley |
| 2009/0326537 A1 | 12/2009 | Anderson |
| 2015/0192450 A1* | 7/2015 | Leone .................. G01F 23/14 |
| | | 701/102 |
| 2017/0204792 A1* | 7/2017 | Thomas ............... F02D 41/042 |
| 2017/0234245 A1* | 8/2017 | Bruner ................. F02D 19/10 |
| | | 123/525 |
| 2018/0073446 A1* | 3/2018 | Ritter ................. F02M 21/0212 |
| 2019/0040804 A1* | 2/2019 | Atterberry .......... F02D 41/1497 |

FOREIGN PATENT DOCUMENTS

| | | |
|---|---|---|
| WO | WO20090604971 | 5/2009 |
| WO | WO2012089618 | 7/2012 |
| WO | WO2013068640 | 5/2013 |
| WO | WO2015168069 | 11/2015 |

* cited by examiner

DUAL FUEL INJECTION SYSTEM FOR OPTIMIZING FUEL USAGE AND MINIMIZING SLIP FOR DIESEL AND GASOLINE ENGINES

PRIORITY CLAIM

In accordance with 37 C.F.R. 1.76, a claim of priority is included in an Application Data Sheet filed concurrently herewith. Accordingly, the present invention claims priority as a continuation of U.S. patent application Ser. No. 17/110,781, entitled "DUAL FUEL INJECTION SYSTEM FOR OPTIMIZING FUEL USAGE AND MINIMIZING SLIP FOR DIESEL ENGINES", filed Dec. 3, 2020, which claims priority as a continuation of U.S. patent application Ser. No. 16/240,385, entitled "DUAL FUEL INJECTION SYSTEM FOR OPTIMIZING FUEL USAGE AND MINIMIZING SLIP FOR DIESEL ENGINES", filed Jan. 4, 2019, which claims priority to U.S. Provisional Patent Application No. 62/613,552, entitled "DUAL FUEL INJECTION SYSTEM FOR OPTIMIZING FUEL USAGE AND MINIMIZING SLIP FOR DIESEL ENGINES", filed Jan. 4, 2018. The contents of the above referenced applications are incorporated herein by reference in their entirety.

FIELD OF INVENTION

The present invention generally relates to internal combustion engines, and more particularly, to an electronically controlled dual fuel injection system for dual fuel diesel and Otto cycle engines.

BACKGROUND INFORMATION

For more than a century, internal combustion engines have been relied upon as a principal source of power in a variety of applications. Of those engines, the most widely used are the reciprocating piston diesel engines which are found in automobiles, trucks, trains and earth moving equipment, as well as other forms of transportation as well as a variety of industrial and consumer applications. Such engines can be built in a variety of sizes, types, and configurations depending on the power requirements of a particular application. The diesel cycle is a combustion process of a reciprocating internal combustion engine. In it, fuel is ignited by heat generated by the compression of air in the combustion chamber, into which fuel is then injected. The Otto cycle engine describes the functioning of a typical spark ignition piston engine.

In an effort to increase the efficiency and reduce the emissions of the diesel cycle engine, different as well as multi-fuels have been utilized. A multi-fuel engine refers generically to any type of engine which is designed to burn multiple types of fuels in a single cycle for its operation. Multi-fuel engines have application in diverse areas to meet particular operational needs in the operating environment. Multi-fuel engines are also desirable where cheaper fuel sources, such as natural gas or propane, are available.

A multi-fuel engine typically operates with a specified mixture of the available fuels. Where a liquid-only fuel mixture is specified, a liquid fuel, such as diesel fuel, gasoline or other liquid hydrocarbon fuel, is injected directly into an engine cylinder or a pre-combustion chamber as the sole source of energy during combustion. When a liquid and gaseous fuel mixture is specified, a gaseous fuel, such as natural gas, methane, hexane, pentane or any other appropriate gaseous hydrocarbon fuel, may be mixed with air in an intake port of a cylinder and a small amount or pilot amount of liquid fuel, such as diesel fuel, is injected into the cylinder or the pre-combustion chamber in order to ignite the mixture of air and gaseous fuel.

Internal combustion engines generate exhaust as a by-product of fuel combustion within the engines. Engine exhaust contains, among other things, un-burnt fuel, particulate matter such as soot, and harmful gases such as carbon monoxide or nitrous oxide. To comply with regulatory emissions control requirements, it is desirable to reduce the amount of soot and harmful gases generated by the engine. Due to the rising cost of liquid fuel (e.g. diesel fuel) and to comply with the emissions control requirements, engine manufacturers have developed dual-fuel engines. Using a lower-cost fuel together with liquid fuel helps improve the cost efficiency of the engine. Further, combustion of the gaseous fuel and liquid fuel mixture lowers the production of undesirable emissions from the engine.

Examples of the utilization of alternative fuels for the diesel cycle engine are as old as the diesel engine itself. The inventor of the diesel engine, Rudolph Diesel—1897, used "natural gas" as a diesel engine fumigant fuel charge. Fumigation of a diesel engine is the addition of a gaseous fuel to the intake air charge of a diesel engine. Development of diesel engine fumigation techniques has continued, such as those as disclosed in Ritter et al., U.S. Pat. No. 6,901,889 and Bach, U.S. Pat. No. 7,100,582.

The pre-heating of diesel fuel to improve combustion efficiency and reduce exhaust gas pollutants has been active since the 1930's. Hypergolic diesel combustion received significant attention in the 1980's. More recently, Tavlarides et al., U.S. Pat. No. 7,488,357 and others disclose methods and apparatus which cause diesel fuel to become supercritical prior to injection into the combustion chamber.

U.S. Pat. No. 4,892,561 to Levine discloses fuels for internal combustion engines which contain at least 50% by weight of methyl ether.

U.S. Pat. No. 5,632,786 to Basu et al. describes a method for operating a spark ignition internal combustion engine utilizing an improved composition containing dimethyl ether and propane as fuel.

U.S. Pat. No. 6,095,102 to Willi et al. teaches a dual fuel engine which creates a substantially homogeneous mixture of gaseous fuel, air, and pilot fuel during a compression stroke.

U.S. Pat. No. 6,145,495 to Whitcome discloses a propane injection system for a diesel engine.

U.S. Pat. No. 6,202,601 to Ouellette et al. describes a method and apparatus for dual fuel injection into an internal combustion engine. A main fuel is ignited by a pilot fuel that is more readily flammable than the main fuel.

U.S. Pat. No. 6,206,940 to Weissman et al. teaches fuel formulations to extend the lean limit.

U.S. Pat. No. 6,213,104 to Ishikiriyama et al. discloses supplying fuel to an internal combustion engine in a supercritical state by raising the pressure and the temperature of the fuel above the critical pressure and temperature.

U.S. Pat. No. 6,286,482 to Flynn, et al. describes a premixed charge compression ignition engine with combustion control.

U.S. Pat. No. 6,324,827 to Basu et al. teaches a method of generating power in a dry low NOx combustion system.

U.S. Pat. No. 6,607,567 to Towfighi discloses propellant gas for tools operated by combustion power on the basis of combustible gases containing a mixture of 40% to 70% by weight of dimethyl ether, nitrous oxide and/or nitromethane, 8% to 20% by weight of propylene, methyl acetylene, propane and/or propadiene and 20% to 45% by weight of isobutane and/or n-butane.

U.S. Pat. Nos. 6,901,889 and 7,225,763 to Ritter, et al. describe systems and methods to reduce particulate and NOx emissions from diesel engines through the use of a dual fuel fumigation system.

U.S. Pat. No. 7,488,357 to Tavlarides, et al. teaches a composition of diesel, biodiesel or blended fuel with exhaust gas mixtures or with liquid CO2. The composition is in a liquid state near the supercritical region or a supercritical fluid mixture such that it quasi-instantaneously diffuses into the compressed and hot air as a single and homogeneous supercritical phase upon injection in a combustion chamber.

Downsides to dual fuel engines are also well known; the gaseous fuel is typically introduced into combustion chambers of the engine during an intake stroke. Because exhaust valves of the combustion chambers may remain open for a portion of the intake stroke, some of the gaseous fuel can escape or "slip" out through the open exhaust valves. The fuel that escapes from the combustion chambers does not participate in combustion, reducing the efficiency of the engine. Additionally, the escaping unburned gaseous fuel contributes to the total amount of undesirable emissions produced by the engine.

One technique for reducing gaseous fuel slip from the combustion chambers is disclosed in International Publication No. WO 2013/068640 to Hägglund ("the '640 publication") that published on May 16, 2013. The '640 publication discloses various embodiments to remove and treat unburned gaseous fuel trapped in dead volumes in the combustion chamber where no combustion occurs. The '640 publication discloses an arrangement of conduits that remove a portion of the exhaust containing the unburned gaseous fuel separately from the remaining portion of the exhaust. The '640 publication also discloses a processing unit for treating the portion of the exhaust containing the unburned gaseous fuel. The treated exhaust is then allowed to mix with the remainder of the exhaust.

Although the '640 publication discloses the use of a processing unit to treat unburned gaseous fuel for improving engine emissions, the disclosed apparatus and method may still not be optimal. In particular, the disclosed apparatus of the '640 publication removes the unburned gaseous fuel after completion of combustion in the engine cylinders. Thus, the unburned gaseous fuel does not contribute to generation of power in the engine, reducing the efficiency of the engine. Further, the disclosed apparatus of the '640 publication requires the use of additional ducting and the use of a processing unit, which may increase the cost of manufacturing and operating the engine. Thus, there is a need in the art for further development of dual fuel diesel cycle engines.

Most modern diesel engines utilize computer control for the introduction of fuel to the combustion chamber. A typical engine speed controller has one controller that acts on speed error to set a fuel rate. For engines that may run on multiple fuels, it is required to set multiple fuel rates based on the fuel fraction or desired ratio of fuels. For example, it may be desired to run a multi-fuel engine on a mixture of 80% natural gas and 20% diesel. However, typical speed controllers (usually proportional-integral controllers, commonly called PI controllers) may only set a fuel rate for a single fuel. The normal way to deal with a multi-fuel engine is to have each PI controller set an individual fuel rate for the corresponding fuel while ignoring the fact that there are other fuels supplying power to the engine. The fuel rates are set as if the other fuels do not exist. After the individual fuel rates are set by the PI controllers, a complicated switching strategy manages the multiple fuel rates, and selects a composite fuel flow based on the specified fuel mixture. The selected composite fuel flow accounts for the availability of the other fuels. If a specific fraction of fuel is desired, such as the 80% natural gas, 20% diesel fuel mixture discussed above, the switching strategy will output multiple fuel flow rates. In this case, separate control signals will be output to the flow control devices for natural gas and diesel fuel to create the fuel flows of each fuel that are necessary for the composite fuel flow. The disadvantages of this type of control structure include the significant amount of design time and effort required for multiple PI controllers and the complexity of the switching strategy to ensure that the overall design is robust and responsive to changes in the input power requirements.

The fuel properties for the fuel may have to be manually input each time an engine tank has to be refilled. The quality of the fuel being used in the engine and the fuel tested in the lab may be different. Also, the quality of the fuel may change after operating the engine for a predetermined time duration. Under such circumstances, the fuel flow rate determined based on the input fuel properties may not be accurate. In view of these conditions, a need exists for an improved multi-fuel engine control strategy that simplifies the process for determining the fuel flow rates for the various fuels available to provide power to the engine. A further need exists for the multi-fuel engine control strategy to adjust or determine the fuel flow rate to provide the necessary power to the engine by considering the changes in the quality of the fuel.

The engine system of the present disclosure solves one or more of the problems set forth above and/or other problems in the art by providing a system that can be retrofit to pre-existing engines as well as new engine systems.

SUMMARY OF THE INVENTION

Briefly, the invention involves a system and method for providing a liquid fuel or a liquid and gaseous fuel to a diesel cycle or Otto cycle engine for operation of the engine. The system includes a primary electronic control module (ECM) which monitors engine sensors and contains a first three-dimensional (3D) fuel map for the liquid fuel. A second ECM is connected for bi-directional transfer of information to the first ECM; the second ECM contains a second three-dimensional fuel map for delivery of the gaseous fuel through a secondary gaseous fuel injection assembly. The bi-directional communication between the two ECMs while monitoring the engine sensors allows both ECMs to "learn" an efficient fuel map for delivery of both fuels in the same cycle for improved efficiency, reduction in slip and lower emissions.

Accordingly, it is an objective of the present invention to provide a system for providing a liquid and a gaseous fuel to a diesel cycle engine.

It is another objective of the present invention to provide a system liquid and a gaseous fuel to an Otto cycle engine.

It is a further objective of the present invention to provide a fuel system that includes an ECU for liquid fuel and a second ECU for gaseous fuel, the two ECUs being in bi-directional communication with each other for learning and constructing 3D fuel maps.

It is yet a further objective of the present invention to provide a unique gaseous fuel nozzle.

It is another objective of the instant invention to provide a gaseous fuel nozzle that allows for late injection to reduce slip.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

DETAILED DESCRIPTION OF THE PREFERRED EMBODIMENTS

Figure 1:
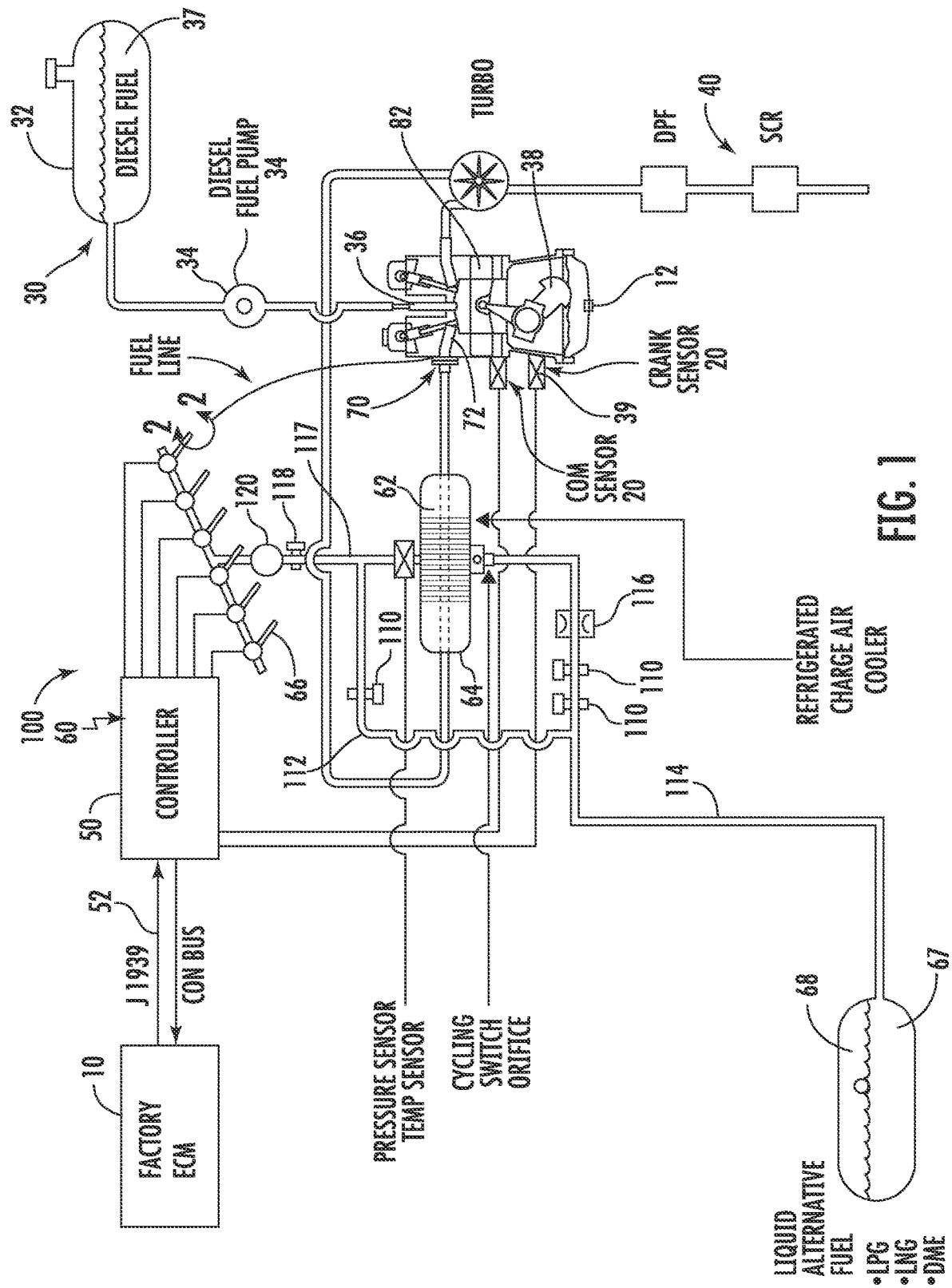
FIG. 1 is a schematic representing one embodiment of the present invention.

While the present invention is susceptible of embodiment in various forms, there is shown in the drawings and will hereinafter be described a presently preferred embodiment with the understanding that the present disclosure is to be considered an exemplification of the invention, and is not intended to limit the invention to the specific embodiments illustrated.

Referring generally to FIGS. 1-8, a liquid and gaseous fuel system 100 for a diesel engine 12 is illustrated. The system includes an engine control module 10 in electrical communication with a plurality of diesel engine sensors 20, a liquid fuel system 30, and an exhaust system 40. The liquid fuel system 30 includes a liquid fuel tank 32, a liquid fuel pump 34 and at least one liquid fuel injector 36 configured to deliver more than a pilot amount of liquid diesel fuel to the diesel engine 12 in accordance with a liquid fuel map stored in the engine control module 10 and feedback from the diesel engine sensors 20, particularly through a J1939 or other suitable communication system. A gaseous fuel controller 50 is provided for bi-directional communication with the engine control module 50. The gaseous fuel controller 50 is also in electrical communication with a gaseous fuel system 60 for supplying gaseous fuel to the diesel engine 12 in accordance with a gaseous fuel map stored in the gaseous fuel controller 50 and feedback from the diesel engine sensors 20. The sensor readings are communicated electrically to the gaseous fuel controller from the engine control module through the J1939 bus line 52 so that the engine control module 10 and the gaseous fuel controller 50 communicate bi-directionally to determine a more than a pilot amount of liquid fuel 37 and an amount of gaseous fuel 62 to inject into the diesel engine 12 based upon the sensor 20 readings to complete combustion. In at least one embodiment, the gaseous fuel controller 50 and the engine control module 10 include a software having artificial intelligence that allows the system to test different mixtures of the two fuels and alter the fuel maps (both liquid and gaseous) to maximize efficiency, power or torque or any combination of these or other parameters controllable with the fuel supply. The desired optimization parameter(s) may be determined by the operator or the manufacturer and the engine control module or the gaseous fuel module may include an input for selection. In this manner, the fuel controllers communicate with each other and the engine sensors to learn the best fuel mixture for a given situation which is then stored for future utilization. This also allows the fuel controllers to compensate for variations in fuel which may be of different qualities from one tank to another. Still yet this allows the engine to be versatile by switching fuel supply maps the engine can be tailored for specific uses.

Still referring to FIGS. 1-8, in a preferred embodiment, the engine control module 10 includes a three-dimensional fuel map (not shown) for determining the more than a pilot amount of the liquid fuel that is delivered to the diesel engine 12 in response to a given set of sensor 20 readings as communicated to the engine control module 10. It is also preferred that the gaseous fuel controller module 50 includes a three-dimensional fuel map (not shown) for determining the amount of the gaseous fuel 62 that is delivered to the diesel engine 12 in response to a given set of sensor 20 readings. The liquid fuel system 30 includes at least one liquid fuel injector in electrical communication with the engine control module 10, whereby liquid fuel is delivered to the diesel engine 12 in accordance with the liquid fuel three-dimensional fuel map and timed to be injected at a predetermined rotation angle of the diesel engine crankshaft 38 as determined by a crankshaft sensor 39. In a most preferred embodiment, the liquid fuel injector 36 is an electronic fuel injector. The gaseous fuel system 60 includes at least one gaseous fuel injector 66 in electrical communication with the gaseous fuel controller 50, whereby gaseous fuel is delivered to the diesel engine 12 in accordance with the gaseous fuel three-dimensional fuel map and timed to be injected at a predetermined rotation angle of the diesel engine crankshaft 38 as determined by the crankshaft sensor 39. The gaseous fuel system also includes a plurality of on/off solenoids 110 for controlling the flow of gaseous fuel from the fuel tank 68 to the chiller 64 as well as to bypass the chiller through bypass line 112. Supply line 114 which carries liquefied gaseous fuel 67 from tank 68 to the chiller includes two of the on/off solenoids 110 as well as a restricted orifice 116 to control the flow of the liquefied gaseous fuel 67. Gaseous fuel supply line 116 carries the gaseous fuel from the chiller 64 to the gaseous fuel injectors 66. The gaseous fuel supply line 116 includes a temp sensor and pressure sensor for measuring the pressure and temperature within the chiller 64. Gaseous fuel lock solenoid 118 is positioned prior to regulator 120 to control the pressure of the gaseous fuel supplied to the gaseous fuel injectors 66. This construction allows the gaseous fuel controller 50 to monitor the pressure and temperature of the chiller 64 as well as control the flow of gaseous and liquid fuel throughout the system. This construction also includes fail safes that allow the gaseous fuel controller 50 to stop or redirect the gaseous fuel should an error be found in one part of the system. Thus, in at least one embodiment, the rotation angle of the crankshaft 38 for the liquid fuel injection from the liquid fuel injector 36 is monitored and controlled by the engine control module 10, and the rotation angle of the crankshaft 38 for the gaseous fuel injection from the gaseous fuel injector 66 is monitored and controlled by the gaseous fuel controller 50. This is facilitated by the bi-directional communication between the engine control module 10 and the gaseous fuel controller 50 through the J1939 bus line 52, such that the rotation angle of the crankshaft 38 for the gaseous fuel injection is supplied electrically from the engine control module 10 to the gaseous fuel controller. With this construction, each controller is allowed to determine the optimum time for injecting each type of fuel to optimize fuel economy and minimize emissions. Alternatively, the controllers can be utilized to improve power, torque or many other desired parameters by altering the combination of the two fuels delivered to the engine. In at least one embodiment, the gaseous fuel system 30 includes a chiller 64 for chilling air entering the diesel engine 12. The chiller 64 receives compressed gaseous fuel in a liquid form 67 from a gaseous fuel tank 68 utilizing a phase change of said liquefied gaseous fuel from a liquid to a gas to chill said incoming air, the incoming air being kept separate from the gaseous fuel during the phase change. This construction increases the density of the air entering the engine 12, while providing sufficient heat to the liquefied fuel 67 to provide the phase change needed for injection of the gaseous fuel 62. A super-cooling device operating on phase change is illustrated in U.S. Pat. No. 7,841,322 issued to the inventor of the present application. It should be noted that liquefied gaseous fuels include, but should not be limited to, propane, liquefied natural gas, Dimethyl ether or any other suitable fuel for diesel or gasoline engines.

Figure 2:
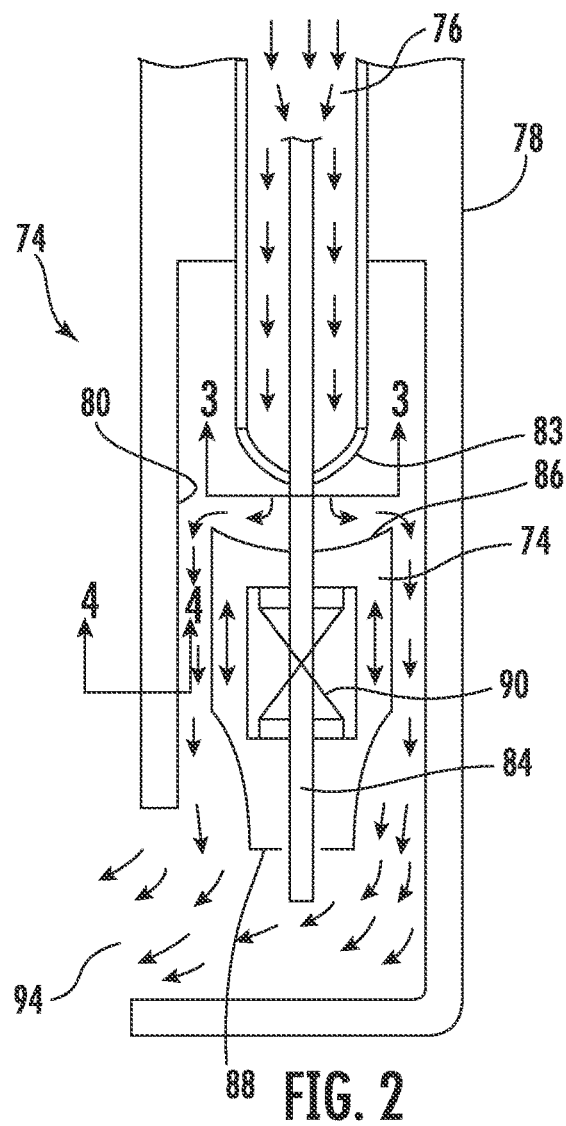
FIG. 2 is a partial section view taken along lines 2-2 of FIG. 1, illustrating a vaporous fuel diffuser of the present invention.

Still referring to FIGS. 1-8, the gaseous fuel injector 70 is positioned within the intake manifold 72 of the diesel engine 12. In general, the gaseous fuel injector 70 includes a pressure operated valve assembly 74 (FIG. 2). The pressure operated supply valve 74 being constructed to open in response to a predetermined gaseous fuel supply line 76 pressure. Thus, the pressure operated supply valve 74 is constructed to close in response to a second predetermined gaseous fuel supply line pressure so that said pressure operated supply valve 74 maintains the second predetermined gaseous fuel supply line 76 pressure between openings of the pressure operated supply valve 74.

Figure 3:
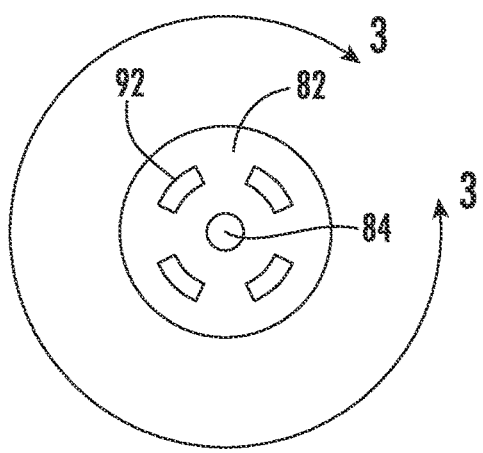
FIG. 3 is a partial front view taken along lines 3-3 of FIG. 2, illustrating the gaseous fuel jet of the gaseous fuel nozzle.
Figure 4:
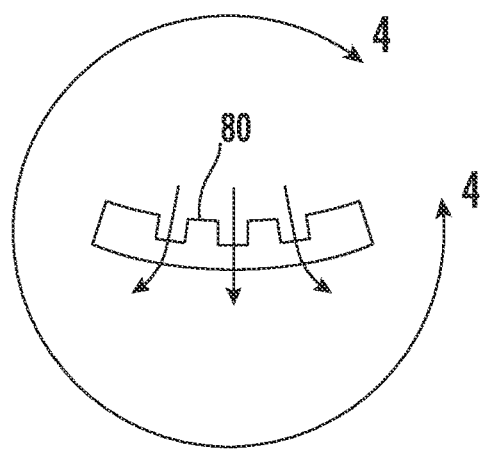
FIG. 4 is a partial end view taken along lines 4-4 of FIG. 2, illustrating the fluted inner wall of the gaseous fuel nozzle.

Referring to FIGS. 2-4, the pressure operated supply valve 74 includes a body 78, the body having a fluted inner surface 80 for mixing the gaseous fuel 62 with air as it flows into a cylinder 82 (FIG. 1) of the diesel engine 12. The gaseous fuel supply line 76 is sealably connected with the body so that the terminal end 83 of the gaseous fuel supply line 76 extends inside of the body 78. A guide pin 84 extends outwardly from the distal end of the gaseous fuel supply line 76 to provide support and guiding to the pressure operated supply valve 74 which includes an aperture 88 that allows the pressure operated supply valve 74 to move freely along the length of the guide pin 84. The pressure operated supply valve 74 preferably includes a convex valve seat 86 for sealing a terminal end of the gaseous fuel supply line 76. However, it should be noted that any other shape suitable for providing a sealing surface may be utilized without departing from the scope of the invention. A spring 90 is provided within the pressure operated supply valve 74 for maintaining the second predetermined gaseous fuel supply line pressure. The terminal end 83 of the gaseous fuel supply line 76 includes a plurality of gas release apertures 92 sized to release a suitable amount of gaseous fuel for combustion in the diesel engine 12. It should also be noted that the gas release apertures 92 may include venturis, helix, screens, directional flows or any other suitable mechanism for modifying or directing the flow of the gaseous fuel as it escapes the gaseous fuel supply line 76. In at least one embodiment, body 78 includes a side discharge port 94, whereby the body is rotatable to maximize efficiency of mixing the gaseous fuel with air and directing the mixture into a cylinder 82 of the diesel or four cycle engine 12.

Figure 5:
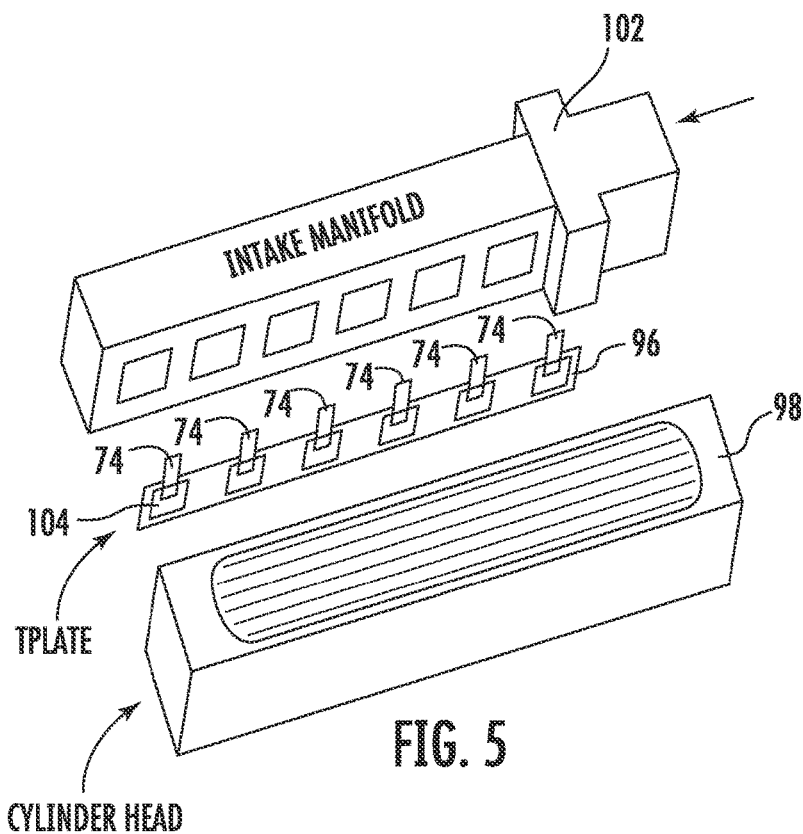
FIG. 5 is a perspective view illustrating one embodiment of an adapter plate of the present invention.
Figure 6:
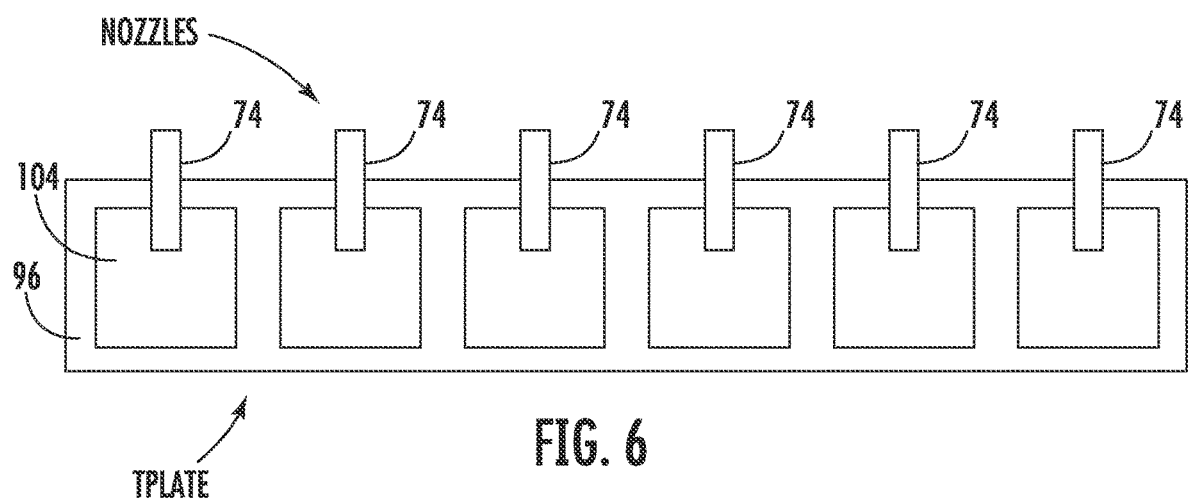
FIG. 6 is an elevation view of an adapter plate suitable for use with the present fuel system.

Referring to FIGS. 5 and 6, the pressure operated supply valve 74 is secured to a T-plate 96. The T-plate 96 is constructed and arranged to be secured between a head portion 98 of a diesel engine 12 and the intake manifold 102 so that a portion of the gaseous fuel supply line 76 extends through the T-plate 96 and is fluidly connected to the pressure operated supply valve 74. The T-plate 96 includes ports 104 sized and shaped to match the intake manifold and/intake ports of the engine. In this manner, the present dual fuel system can be retrofit onto new or pre-existing gasoline or diesel rotary crankshaft reciprocating piston engines without modification to the engine. This construction also positions the gaseous fuel in close proximity to the intake valve of the engine, minimizing delay in getting the gaseous fuel to the cylinder.

Figure 7:
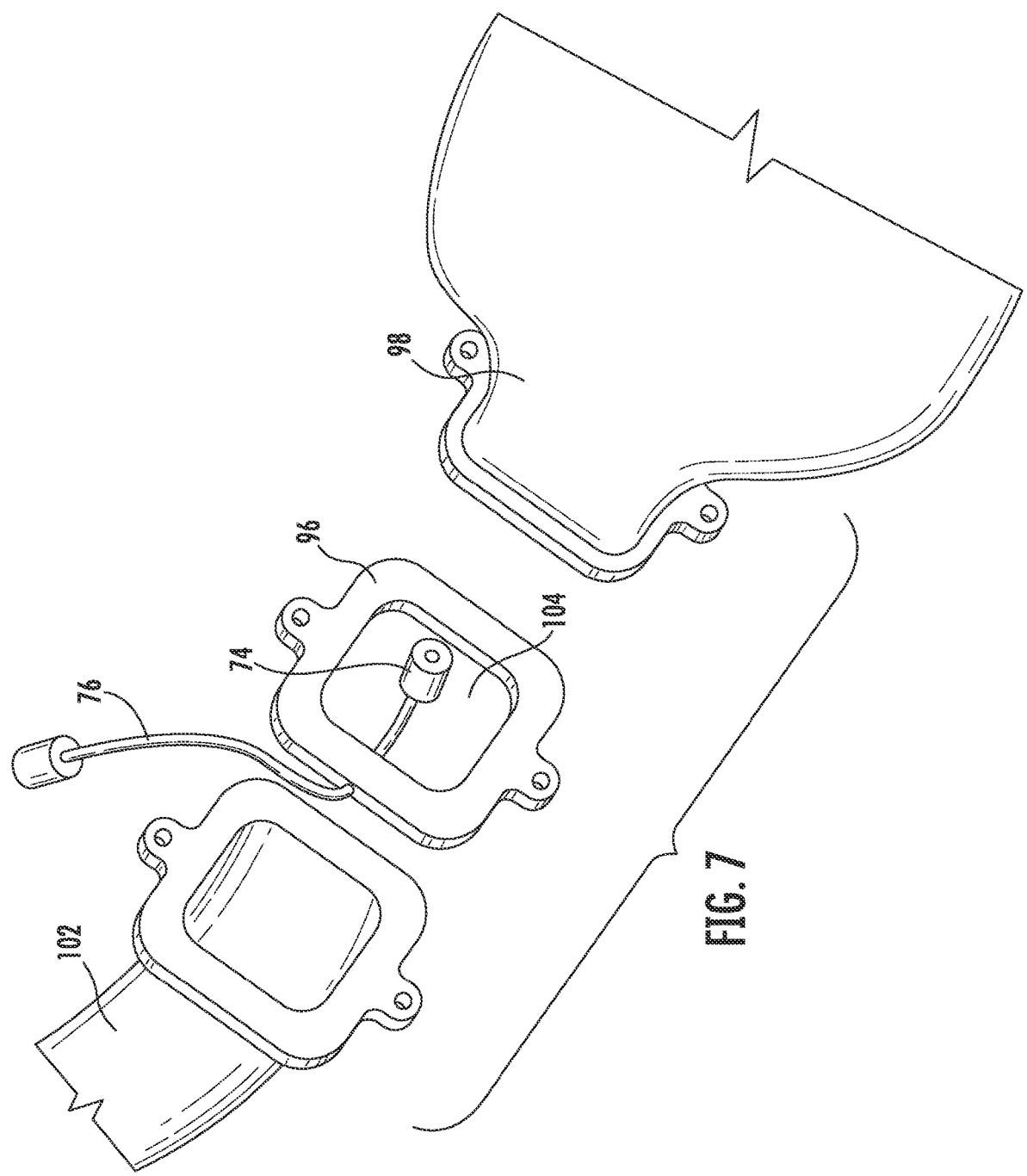
FIG. 7 is a partial perspective view illustrating an alternative adapter plate for the present fuel system.
Figure 8:
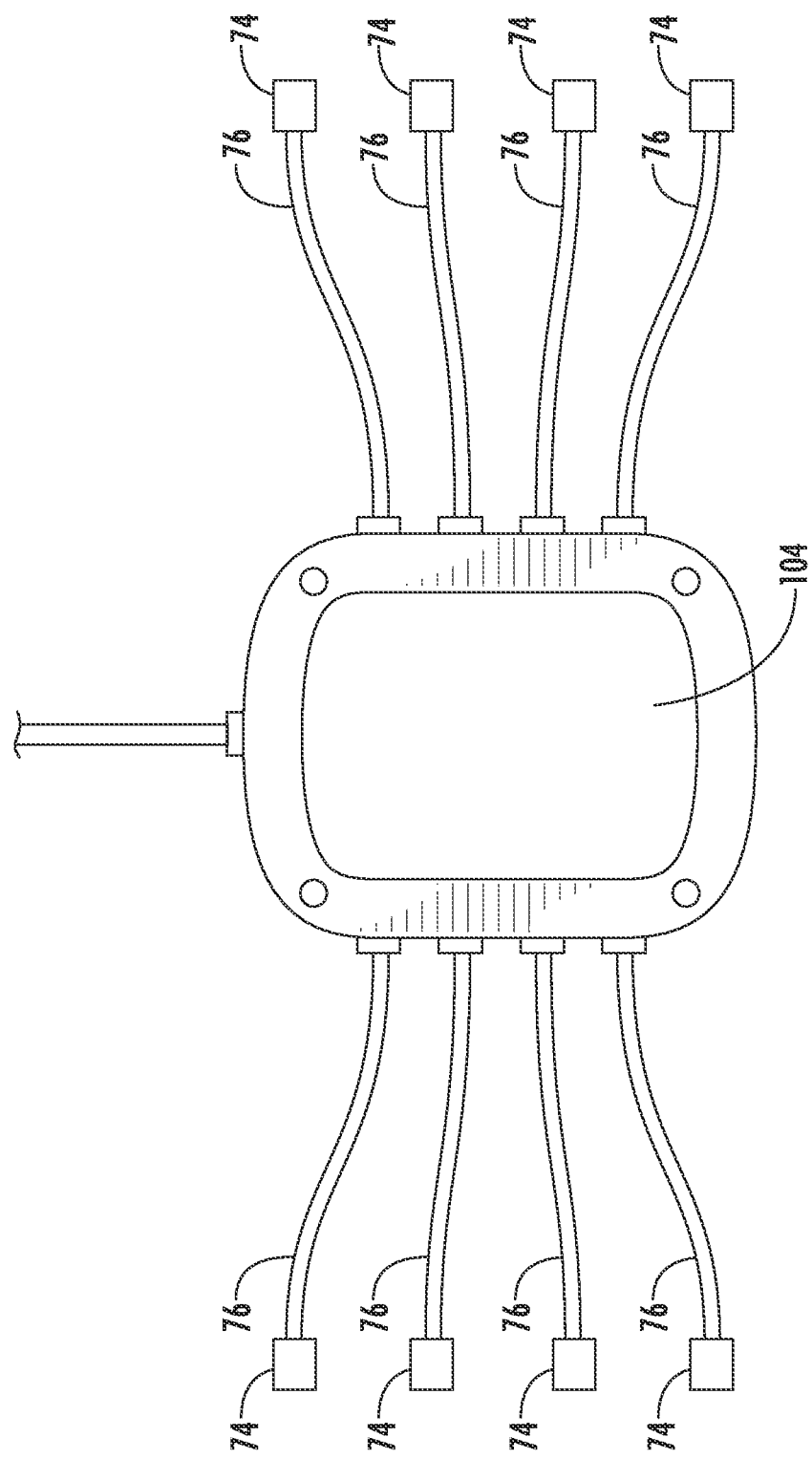
FIG. 8 is yet another alternative embodiment of an adapter plate suitable for use with the present fuel system.
Figure 9:
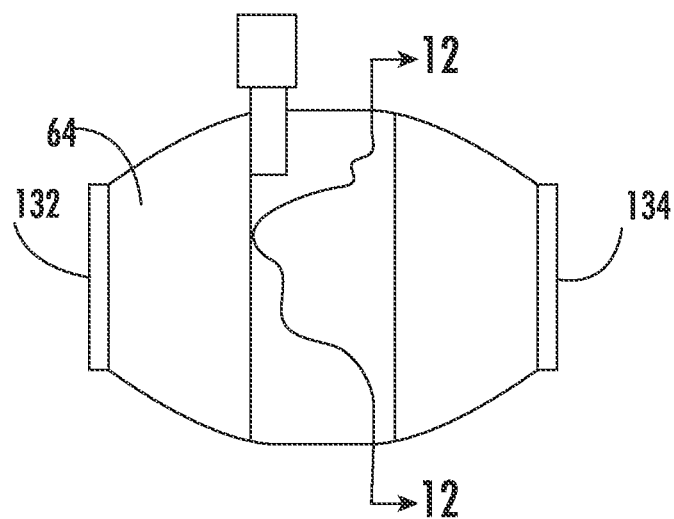
FIG. 9 is a side view of one embodiment of the chiller of the present system.
Figure 10:
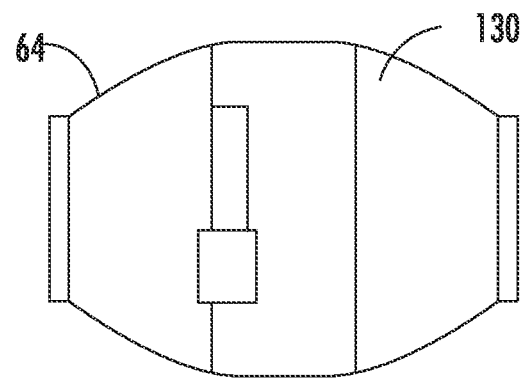
FIG. 10 is a top view of the chiller.
Figure 11:
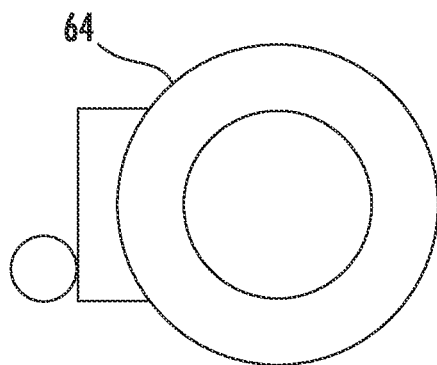
FIG. 11 is an end view of the chiller.

Referring to FIGS. 7 and 8, alternative embodiments of the T-plate 96 are illustrated. In these embodiments, the gaseous fuel supply line 76 extends any desired length through the T-plate so that the gaseous fuel supply line 76 extends toward the intake valve of the diesel engine 12. In this manner, the gaseous fuel supply line 76 can be formed to not restrict the flow of incoming air, and the pressure operated supply valve 74 can be positioned in close proximity to the intake valve of the diesel engine without modification of the intake manifold or head of the diesel engine.

Figure 12:
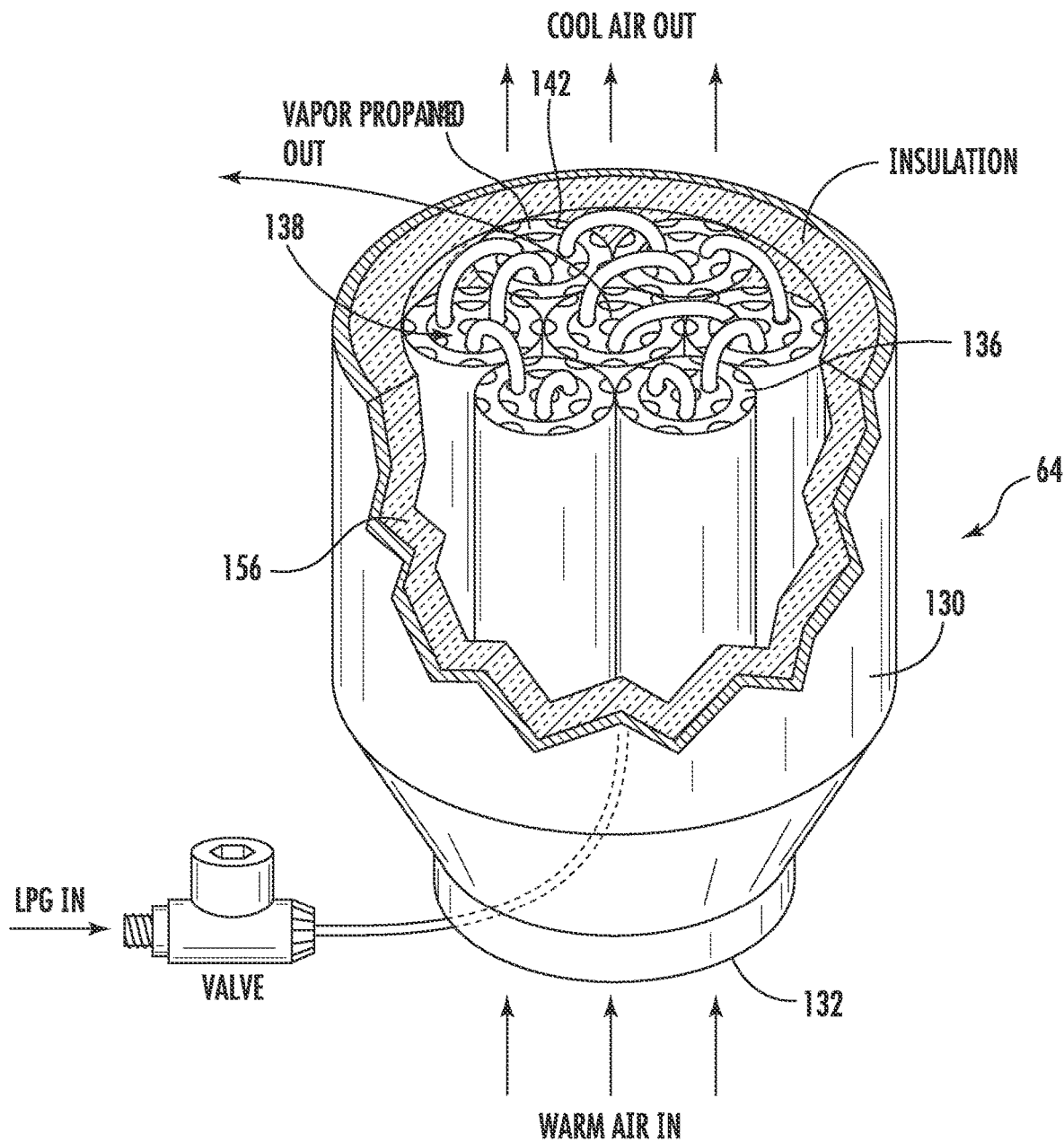
FIG. 12 is a perspective view taken along lines 12-12 of FIG. 9.
Figure 13:
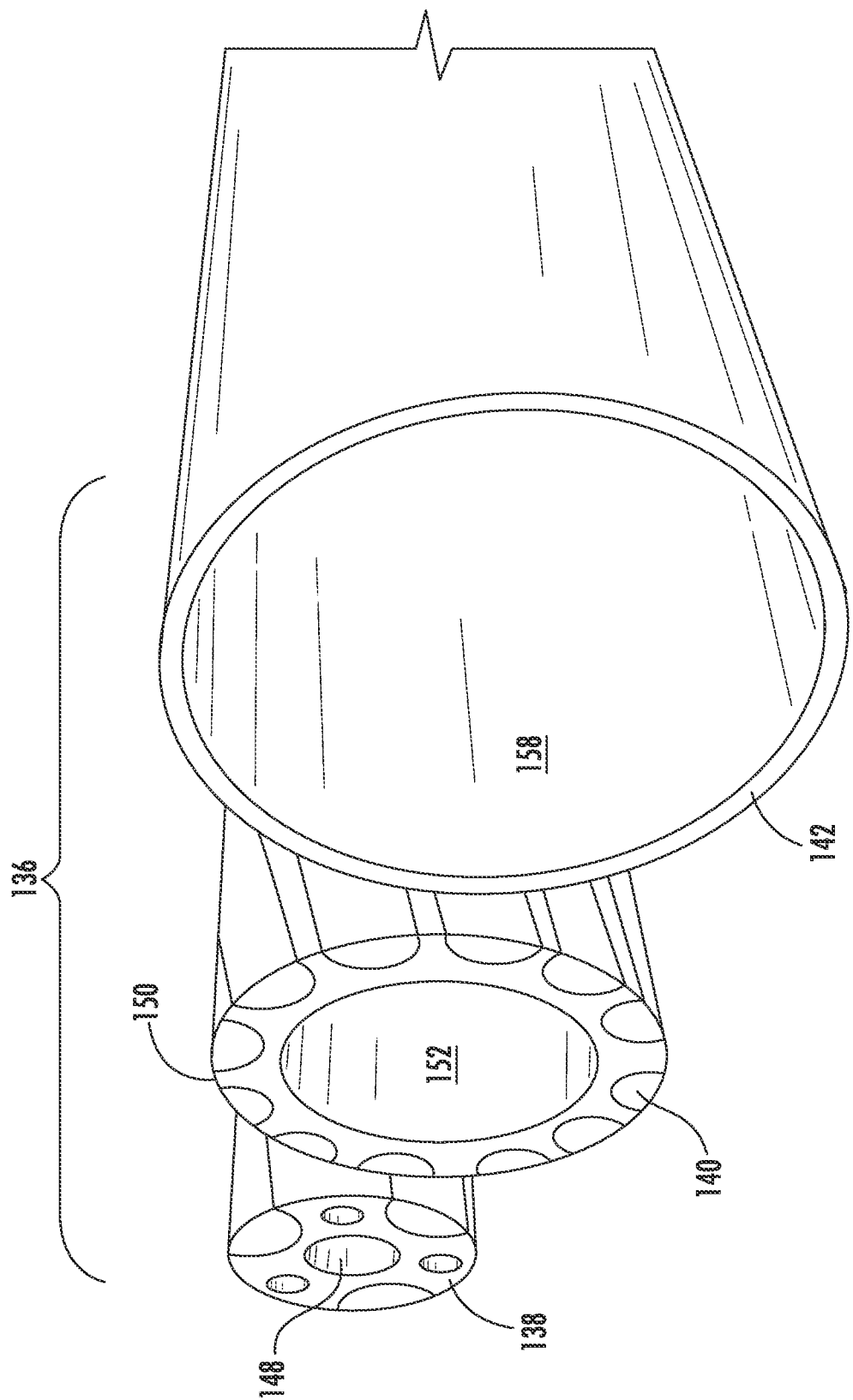
FIG. 13 is a perspective view illustrating the air phase change components.
Figure 14:
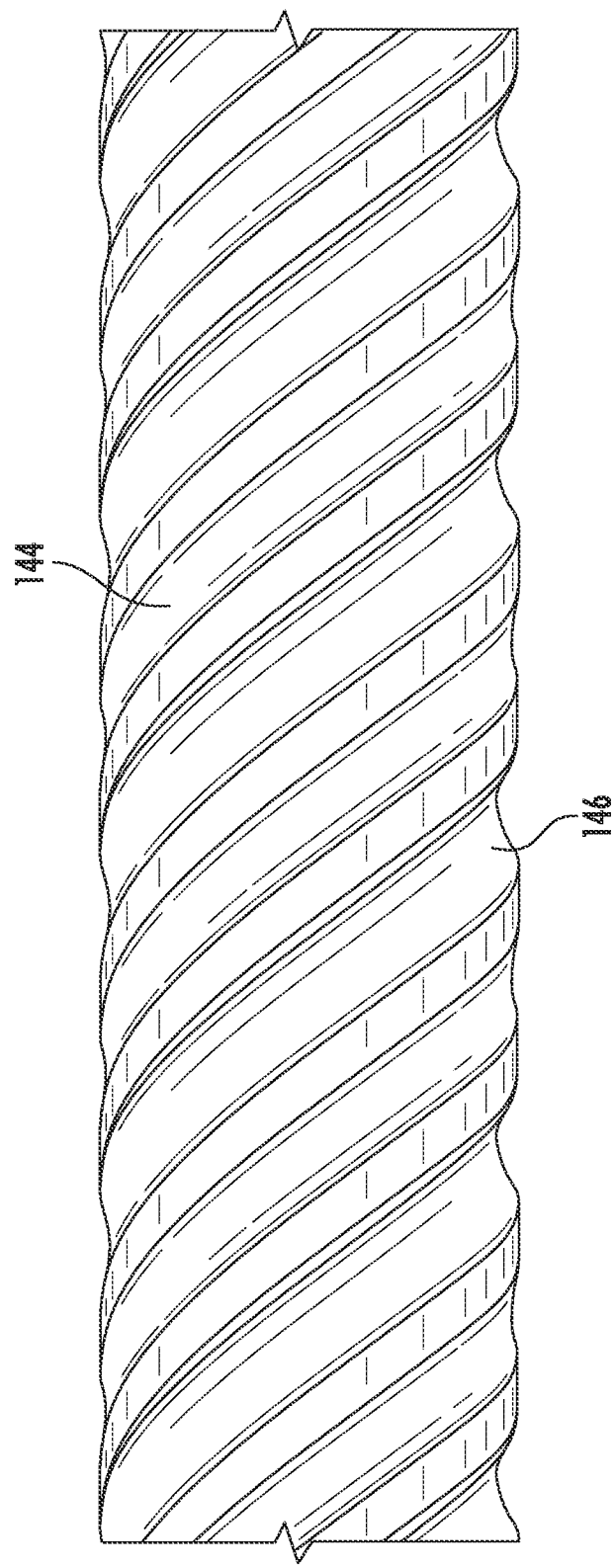
FIG. 14 is a side view illustrating the inner phase change screw.

Referring to FIGS. 1, and 9-14, the chiller assembly 64. The chiller assembly 64 includes an outer housing 130 having an inlet 132 for incoming air to the engine and an outlet 134 from which cooled air flows to the engine. Inside of the housing 130 is a plurality of phase change screws 136. The phase change screws are constructed and arranged to divide the incoming air into smaller streams and direct the smaller streams of air in a helical pattern in close proximity to the screws surface. Inside of the screws is directed a flow of liquefied gaseous fuel 67 which undergoes a phase change due to the heat of the incoming air converting the liquid to gas and super cooling the screws thereby substantially reducing the incoming air temperature as it flows though the chiller. The now gaseous fuel is then supplied to the engine for combustion through the remainder of the system. In the preferred embodiment, the screw assembly 136 includes a first screw 138 sized to fit within a second screw 140 that is sized to fit within an outer tube member 142 as shown in FIG. 12. In a preferred embodiment, the first screw 138 includes a first helix 144 which provides a path for the liquefied gaseous fuel while the second helix 146 allows incoming air to pass in a parallel pattern to the phase changing fuel. A central air passage 148 is also provided through the first screw 138. The second screw 140 is positioned around the first screw 138 to maintain the phase changing fuel within the first helix 144 and the incoming air in the second helix 146 without allowing the air and fuel to mix. The second screw 140 includes a third helix 150 for directing the incoming air around the second screw 140 which is cooled by the phase changing fuel contacting inner surface 152. The outer diameter of the second screw 140 is sized to fit snuggly into an inner surface 158 of the outer tube member 142. In one embodiment, about 7 of the phase change screws 136 are grouped together inside of the outer housing 130 so that the fuel flows in a continuous stream through the phase change screws in a series configuration. However, it should be noted that while the it is preferable that the fuel flow through the phase change screws in series a parallel flow pattern is also contemplated. The construction of the phase change screws provides modularity to the chiller by allowing any number of the phase change screws to be incorporated into a chiller. Thus, the same construction can be utilized to provide chilled intake air to engines of any size from small single cylinder engines to huge multi-cylinder engines by adding or subtracting the number of phase change screws. Insulation 154 may be provided between the outer housing 130 and an inner housing 156 to retain the super cooled temperatures within the chiller. In the preferred embodiment, the phase change screws are constructed from aluminum for its conductive properties and ease of machining. However, the phase change screws may be constructed from any suitable material that provides conductivity suitable to phase change a sufficient amount of liquefied gaseous fuel from liquid to gas.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention, and that the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of operating an internal combustion engine on a combination of liquid and gaseous fuel comprising:
    fluidly connecting a liquid fuel system including a liquid fuel tank, a liquid fuel pump and at least one liquid fuel injector to a diesel engine, the liquid fuel system constructed and arranged to deliver liquid fuel to the internal combustion engine in accordance with a liquid fuel map electronically stored in an engine control module;
    fluidly connecting a gaseous fuel system including a gaseous fuel tank and at least one gaseous fuel injector for supplying gaseous fuel to the diesel engine in accordance with a gaseous fuel map stored in a gaseous fuel controller;
    electrically connecting the engine control module and the gaseous fuel controller together for bi-directional electrical communication with respect to each other;
    providing electrical feedback from the engine sensors to both the engine control module and the gaseous fuel controller; and
    causing the engine control module and the gaseous fuel controller to communicate bi-directionally to utilize the electrical feedback from the engine sensors, the liquid fuel map and the gaseous fuel map to determine a pilot amount of the liquid fuel and at least an amount of the gaseous fuel injected into the diesel engine based upon said sensor readings to complete a combustion cycle of the diesel engine.

2. The method of operating an internal combustion engine on a combination of liquid and gaseous fuel of claim 1, wherein the engine control module includes a three-dimensional fuel map for determining the pilot amount of the liquid fuel that is delivered to the diesel engine in response to a given set of sensor readings.

3. The method of operating an internal combustion engine on a combination of liquid and gaseous fuel of claim 2, wherein said gaseous fuel controller module includes a three-dimensional fuel map for determining the amount of said gaseous fuel that is delivered to said engine in response to a given set of sensor readings.

4. The method of operating an internal combustion engine on a combination of liquid and gaseous fuel of claim 1, wherein said at least one liquid fuel injector is an electronic fuel injector in electrical communication with said engine control module, whereby liquid fuel is delivered to said engine in accordance with a liquid fuel three-dimensional fuel map and timed to be injected at a predetermined rotation angle of the crankshaft of the diesel engine.

5. The method of operating an internal combustion engine on a combination of liquid and gaseous fuel of claim 4, wherein said at least one gaseous fuel injector is in electrical communication with said gaseous fuel controller, wherein gaseous fuel is delivered to said engine in accordance with a three-dimensional gaseous fuel map and timed to be injected at a predetermined rotation angle of the crankshaft of the diesel engine.

6. The method of operating an internal combustion engine on a combination of liquid and gaseous fuel of claim 5, wherein the rotation angle of the crankshaft for injection of the liquid fuel is monitored and controlled by the engine control module and the rotation angle of the crankshaft for injection of the gaseous fuel is monitored and controlled by the gaseous fuel controller.

7. The method of operating an internal combustion engine on a combination of liquid and gaseous fuel of claim 1, wherein the timing of said liquid fuel injection is monitored and controlled by said engine control module with respect to engine rotation and timing of said gaseous fuel injection is monitored and controlled by said engine control module with respect to liquid fuel injection, a timing signal for gaseous fuel injection supplied electrically from said engine control module to said gaseous fuel controller.

8. The method of operating an internal combustion engine on a combination of liquid and gaseous fuel of claim 1, wherein the timing of said liquid fuel injection is monitored and controlled by said engine control module with respect to engine rotation and timing of said gaseous fuel injection is monitored and controlled by said gaseous fuel controller with respect to engine rotation.

9. The method of operating an internal combustion engine on a combination of liquid and gaseous fuel of claim 4, wherein said gaseous fuel injector is positioned within an intake manifold of said engine.

10. The method of operating an internal combustion engine on a combination of liquid and gaseous fuel of claim 4, wherein said gaseous fuel injector includes a pressure operated supply valve, said pressure operated supply valve being constructed to open in response to a predetermined gaseous fuel supply line pressure.

11. The method of operating an internal combustion engine on a combination of liquid and gaseous fuel of claim 10, wherein said pressure operated supply valve is constructed to close in response to a second predetermined gaseous fuel supply line pressure, said pressure operated supply valve maintaining said second predetermined gaseous fuel supply line pressure between openings of said pressure operated supply valve.

12. The method of operating an internal combustion engine on a combination of liquid and gaseous fuel of claim 11, wherein said pressure operated supply valve is secured to a T-plate, said T-plate secured between a head portion of said diesel engine and said intake manifold, said T-plate including a portion of a gaseous fuel supply line extending through said T-plate and fluidly connected to said pressure operated supply valve.

13. The method of operating an internal combustion engine on a combination of liquid and gaseous fuel of claim 11, wherein said pressure operated supply valve is secured to a T-plate, said T-plate secured between an intake conduit of said diesel engine and said intake manifold, said T-plate including a portion of a gaseous fuel supply line extending through said T-plate and fluidly connected to said pressure operated supply valve.

14. The method of operating an internal combustion engine on a combination of liquid and gaseous fuel of claim 13, wherein a portion of said gaseous fuel supply line extends out of said T-plate and extends through an intake port of said diesel engine to an area adjacent to an intake valve of said diesel engine.

15. The method of operating an internal combustion engine on a combination of liquid and gaseous fuel of claim 11, wherein said pressure operated supply valve includes a spring for maintaining said second predetermined gaseous fuel supply line pressure.

16. The method of operating an internal combustion engine on a combination of liquid and gaseous fuel of claim 11, wherein said pressure operated supply valve includes a fluted inner surface for mixing said gaseous fuel with air as it flows into a cylinder of said diesel engine.

17. The method of operating an internal combustion engine on a combination of liquid and gaseous fuel of claim 11, wherein said pressure operated supply valve includes a convex valve seat for sealing a terminal end of said gaseous fuel supply line.

18. The method of operating an internal combustion engine on a combination of liquid and gaseous fuel of claim 11, wherein said pressure operated supply valve includes a side discharge port, said pressure operated supply valve rotatable to maximize efficiency of mixing said gaseous fuel with air and directing said mixture into a cylinder of said diesel engine.

19. The method of operating an internal combustion engine on a combination of liquid and gaseous fuel of claim 1, including a chiller for chilling air entering said diesel engine, said chiller utilizing a phase change of said gaseous fuel from a liquid to a gas to chill said incoming air, said incoming air being kept separate from said gaseous fuel during said phase change.

20. The method of operating an internal combustion engine on a combination of liquid and gaseous fuel of claim 19, wherein said chiller includes at least one phase change screw assembly, said phase change screw assembly having phase changing fuel channels in parallel with incoming air channels so that cooling from said phase change cools said incoming air.

21. The method of operating an internal combustion engine on a combination of liquid and gaseous fuel of claim 20, wherein said phase change screw assembly routes said phase changing fuel and said incoming air in a helical pattern as both flow though said chiller.

22. The method of operating an internal combustion engine on a combination of liquid and gaseous fuel of claim 21, wherein said phase change screw assembly includes a first screw positioned inside of a second screw surrounded by an outer tube.

23. The method of operating an internal combustion engine on a combination of liquid and gaseous fuel of claim 20, including a plurality of said phase change screw assemblies.

* * * * *